US011321670B2

(12) United States Patent
Cirrincione et al.

(10) Patent No.: US 11,321,670 B2
(45) Date of Patent: May 3, 2022

(54) LOCATION-BASED EMPLOYMENT SEARCH AND SCHEDULING SYSTEM

(71) Applicant: CATCH A SHIFT, LLC, Elk Grove Village, IL (US)

(72) Inventors: Thomas Cirrincione, Lake Forest, IL (US); Alfredo Anaya, Chicago, IL (US)

(73) Assignee: CATCH A SHIFT, LLC, Elk Grove Village, IL (US)

( * ) Notice: Subject to any disclaimer, the term of this patent is extended or adjusted under 35 U.S.C. 154(b) by 132 days.

(21) Appl. No.: 16/144,039

(22) Filed: Sep. 27, 2018

(65) Prior Publication Data

US 2019/0102743 A1 Apr. 4, 2019

Related U.S. Application Data

(60) Provisional application No. 62/566,910, filed on Oct. 2, 2017.

(51) Int. Cl.
| | |
|---|---|
| *G06Q 10/10* | (2012.01) |
| *G06Q 40/00* | (2012.01) |
| *H04L 67/306* | (2022.01) |
| *G06F 16/29* | (2019.01) |
| *G06F 16/9535* | (2019.01) |

(52) U.S. Cl.
CPC ......... *G06Q 10/1053* (2013.01); *G06F 16/29* (2019.01); *G06F 16/9535* (2019.01); *G06Q 40/125* (2013.12); *H04L 67/306* (2013.01)

(58) Field of Classification Search
None
See application file for complete search history.

(56) References Cited

U.S. PATENT DOCUMENTS

| | | | |
|---|---|---|---|
| 2011/0060633 A1* | 3/2011 | Janakiraman | G06Q 30/0214 705/14.16 |
| 2013/0024105 A1 | 1/2013 | Thomas | |
| 2016/0104096 A1* | 4/2016 | Ovick | G06Q 10/063112 705/7.14 |
| 2016/0275439 A1* | 9/2016 | Avats | G06Q 10/1053 |
| 2017/0039525 A1* | 2/2017 | Seidle | G06Q 10/1053 |

OTHER PUBLICATIONS

Owen Gough, The top 11 apps and services for employee location tracking, smallbusiness.co.uk, https://smallbusiness.co.uk/top-11-apps-services-2540313/, Aug. 17, 2017 (NPL: Gough) (Year: 2017).*
Route4Me, https://www.route4me.com/, Sep. 30, 2017 (NPL: Route4Me) (Year: 2017).*
Route4Me, https://www.route4me.com/, Sep. 30, 2017 (Year: 2017).*
Kuhn, Peter, and Mikal Skuterud. "Job search methods: Internet versus traditional." Monthly Lab. Rev. 123 (2000): 3. (Year: 2000).*

* cited by examiner

*Primary Examiner* — David P Sharvin
*Assistant Examiner* — Brock E Turk
(74) *Attorney, Agent, or Firm* — Barnes & Thornburg LLP

(57) ABSTRACT

A location-based system that is able to match job seekers with employers based on the geographic location detected by the job seeker's mobile phone and the location of the work in the job posting. This system may be used by employers to fill an urgent need, such as an upcoming event or shift occurring in days or hours. In some embodiments, the system automatically selects job seekers for employers based on a rating system for job seekers; the rating system may be based on surveys performed by employers regarding the job seeker's performance in previous job postings.

18 Claims, 11 Drawing Sheets

LOCATION-BASED EMPLOYMENT SEARCH AND SCHEDULING SYSTEM

RELATED APPLICATIONS

This application claims the benefit of U.S. Provisional Application Ser. No. 62/566,910 filed Oct. 2, 2017 for a Location-Based Employment Search and Scheduling System, which is hereby incorporated by reference in its entirety.

TECHNICAL FIELD

This system relates generally to a computerized system of searching for time-sensitive employment opportunities; in particular, this system relates to a location-based system that matches job seekers with employers for work positions.

BACKGROUND AND SUMMARY

Employers attempting to fill job positions have several ways of posting job listings. In some cases, an employer may simply post a sign at the business' location indicating that there are job openings available. To obtain a more widespread reach, an employer could list job opportunities on a job searching website. Even with these ways of posting jobs, however, finding quality employees or contractors can be problematic.

One downside is sorting through the multiplicity of resumes generated by job searching websites. This can be time consuming for the employer to filter. Moreover, it can be difficult for employers to determine which candidates would make the best employees or contractors without undergoing the time consuming task of contacting the job candidates' former employers.

Another downside to job listing websites is timeliness of obtaining workers. In some cases, a need may arise for an employer to fill a vacancy in a rushed time period, such as only a few hours. For example, if an employee calls in sick for a shift, an employer may only have a couple hours to try to fill that shift with a contractor. The existing job posting websites are not equipped to handle such an urgent hiring need by an employer.

The job searching websites can also be problematic for job seekers. Although many of these websites allow a job seeker to filter postings based on a city and state, a job seeker without a vehicle may need to find a local job to which the commute could be made by walking or riding a bicycle where a more exact location can be important. For job seekers looking to fill a short-term job, such as an upcoming shift in the next day, these employment searching websites are not equipped to handle short-time temporary jobs.

According to one aspect, this disclosure provides a location-based system that is able to match job seekers with employers based on the geographic location detected by the job seeker's mobile phone and the location of the work in the job posting. In some embodiments, this system can be used by employers to fill an urgent need, such as an upcoming event or shift occurring in days or hours. The fast timing with which this system allows employers to fulfill employment needs is a technical problem solved by this system. In some embodiments, the system can automatically select job seekers for employers based on a rating system for job seekers; in some cases, the rating system can be based on surveys performed by employers regarding the job seeker's performance in previous job postings. This automatic selection of job seeker based on a rating system is another technical problem solved by this disclosure.

BRIEF DESCRIPTION OF THE DRAWINGS

The present disclosure will be described hereafter with reference to the attached drawings which are given as non-limiting examples only, in which.

Figure 1:
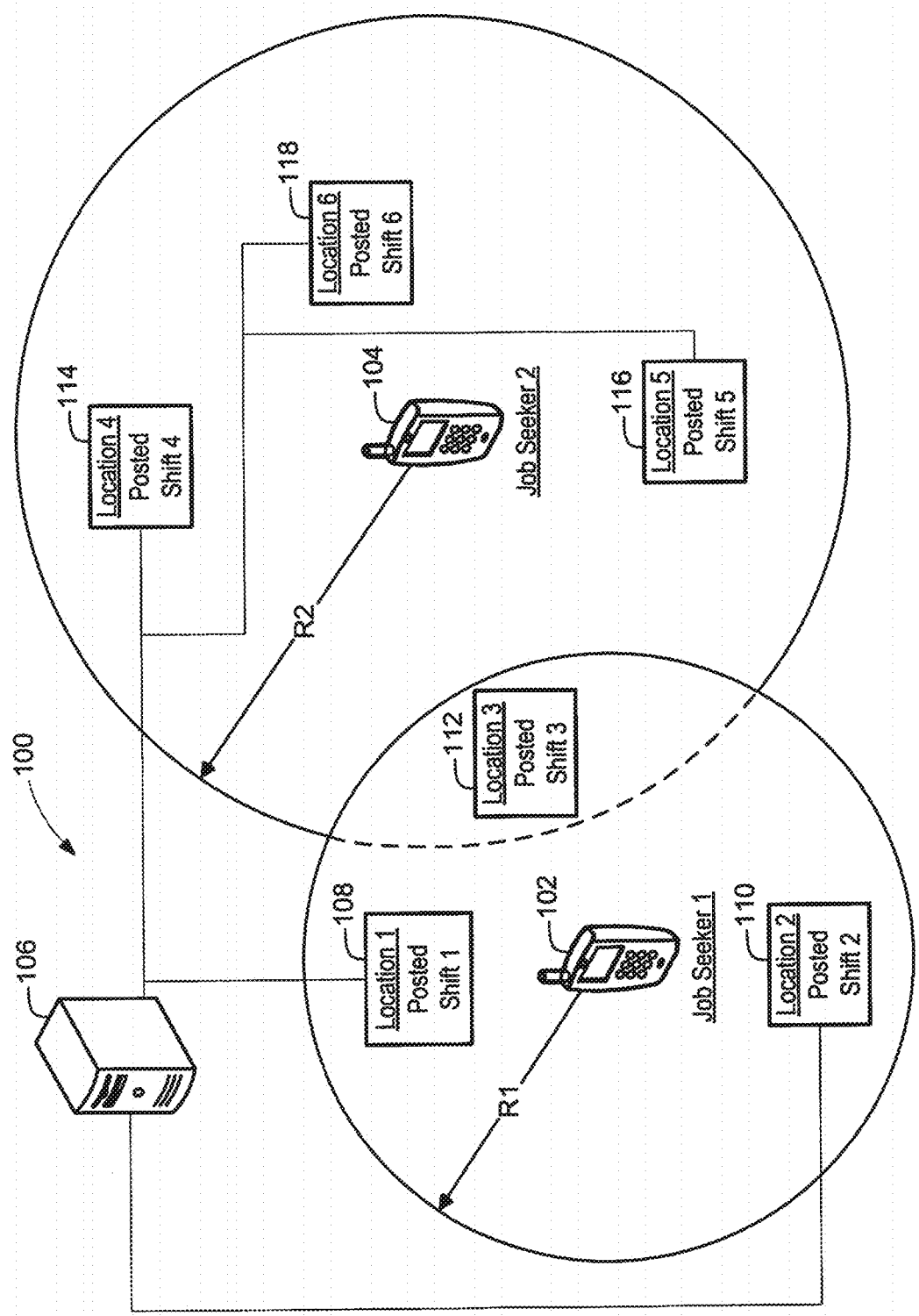
FIG. 1 is diagrammatic view of a location-based system and method for matching job seekers with employers based on their respective geographical locations according to an embodiment of the present invention.

Corresponding reference characters indicate corresponding parts throughout the several views. The components in the figures are not necessarily to scale, emphasis instead being placed upon illustrating the principals of the invention. The exemplification set out herein illustrates embodiments of the invention, and such exemplification is not to be construed as limiting the scope of the invention in any manner.

DETAILED DESCRIPTION OF THE DRAWINGS

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the disclosure.

This invention relates to a location-based system that is able to match job seekers with employers based on the geographic location detected by the job seeker's mobile phone and the location of the work in the job posting. In some embodiments, this system can be used by employers to fill an urgent need, such as an upcoming event or shift occurring in a days or hours. The fast timing with which this system allows employers to fulfill needs is a technical problem solved by this system. In some embodiments, the system can automatically select job seekers for employers based on a rating system for job seekers; in some cases, the rating system can be based on surveys performed by employers regarding the job seeker's performance in previous job postings. Although this system will primarily be described with respect to the restaurant industry, one skilled in the art should appreciate that the system can be applied to a variety of job types and the restaurant industry is merely an example for purposes of illustration.

Figure 2:
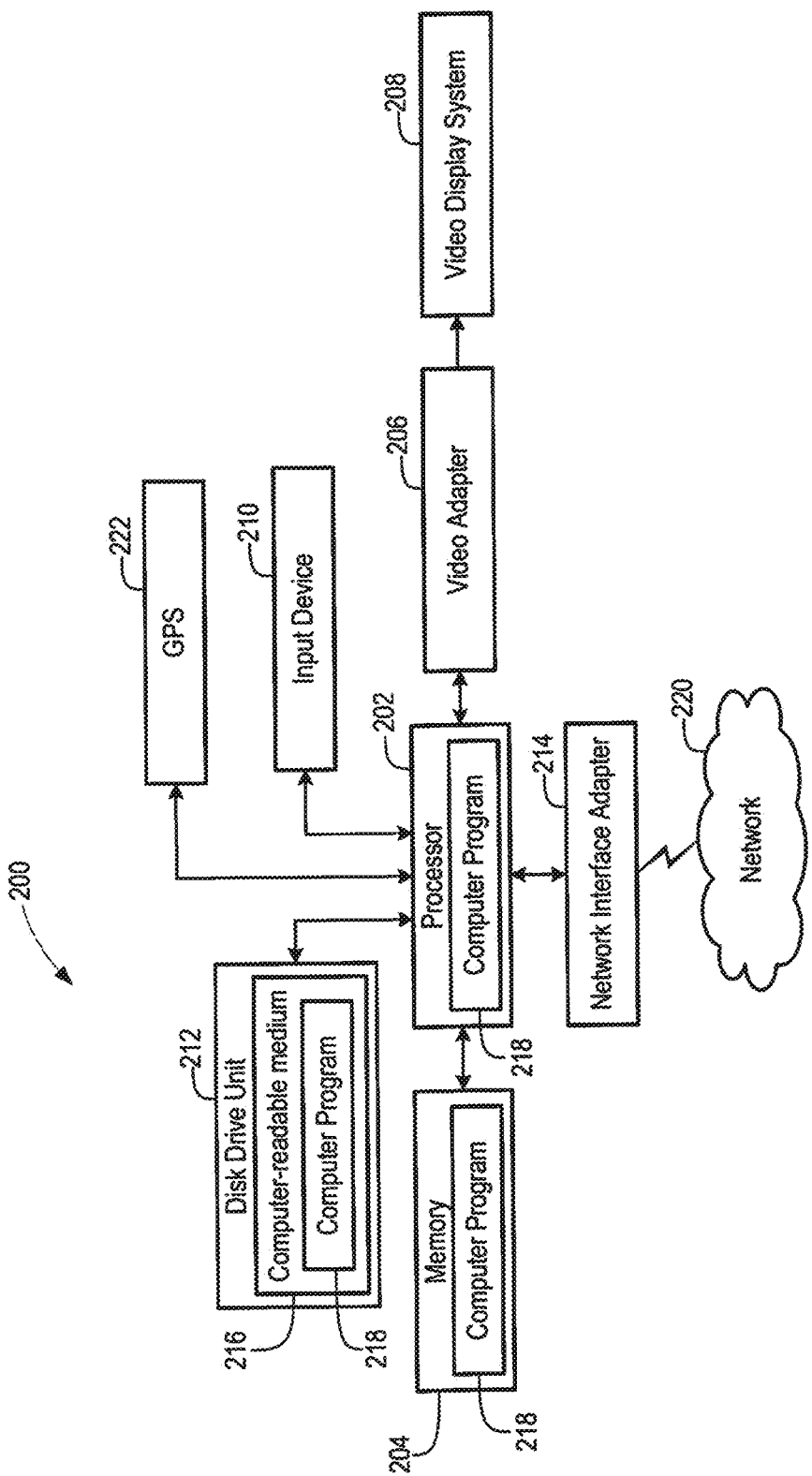
FIG. 2 is a block diagram of an example device that could be used in conjunction with the system and method according to an embodiment of the present invention.

FIG. 1 illustrates an embodiment of the system 100 in which a plurality of job seekers are able to search for job postings based on a user-selected distance from their geographic location. The geographic position of the job seeker could be determined by, for example, the global positioning system ("GPS") unit on the job seeker's mobile device, such as a smart phone, tablet, computer, etc. In the example shown, there is a server 106 from which job postings can be searched by job seeker devices 102, 104 using a network 220 (FIG. 2). The network 220 may be any type of communication scheme that allows computing devices to share and/or transfer data, but would typically allow wireless and/or cellular communication between the mobile devices 102, 104 and the server 106. As shown, job seeker 1's mobile device 102 is set at a maximum distance of "R1" for searching job postings. Accordingly, in this example, a job posting in which work will be performed more than a distance of "R1" from the job seeker 1's mobile device 102 will not be shown in search results. In this example, the system 100 will match a first posting 108, a second posting 110, and a third posting 112 as being within the distance of "R1" from job seeker 1's mobile device 102. As shown, the job seeker 2's mobile device 104 is set at a distance of "R2" for filtering job postings. Accordingly, based on the distance "R2" from job seeker 2's mobile device 104, the system 100 will match the third posting 112, a fourth posting 114, a fifth posting 116, and a sixth posting 118.

Although this example shows two job seeker devices 102, 104 in FIG. 1 for purposes of simplicity, there could be thousands or millions (or more) of job seekers using the system 100. Likewise, even though a single server 106 is shown for purposes of simplicity, there could be more than one server 106. For example, it should be appreciated that various subsystems (or portions of subsystems) of the server 106 may operate on different computing devices. Embodiments are contemplated in which the mobile devices 102, 104 may be devices running the Android™ operating system by Google, Inc. of Mountain View, Calif. or a device running iOS™ operating system by Apple Inc. of Cupertino, Calif. on which software has been installed to run one or more methods according to an embodiment of the present disclosure. For example, the mobile devices 102, 104 may have an app installed that allows a job seeker to search for job postings and perform other actions described herein. Likewise, employers may interact with the server 106 using an app installed on a mobile device that allows an employer to post job listings and perform other actions described herein. In some embodiments, the server 106 could host a website from which job seekers and/or employers could access the features described below.

FIG. 2 illustrates a diagrammatic representation of mobile devices 102 and/or 104 and/or server 106 in the example form of a machine 200 that may be programmed with a set of instructions to perform any one or more of the methods discussed herein. The set of instructions could be a computer program stored locally on the device that, when executed, causes the device to perform one or more of the methods discussed herein. In some embodiments, at least a portion of the set of instructions could be stored remotely such that, when executed, causes the device to perform one or more of the methods discussed herein. In embodiments where the computer program is locally stored, data may be retrieved from local storage or from a remote location via a network.

Embodiments are contemplated in which the mobile devices 102 and/or 104 and/or server 106 may operate in the capacity of a server or a client machine in a server-client network environment, or as a peer machine in a peer-to-peer (or distributed) network environment. Accordingly, the terms "mobile device," "computer" and "server" shall also be taken to include any collection of machines that individually or jointly execute a set (or multiple sets) of instructions to perform any one or more of the methods discussed herein.

The machine 200 illustrated in FIG. 2 includes a processor 202 (e.g., a central processing unit ("CPU")), a memory 204, a video adapter 206 that drives a video display system 208 (e.g., a liquid crystal display ("LCD") or a cathode ray tube ("CRT")), an input device 210 (e.g., a keyboard, mouse, touch screen display, etc.) for the user to interact with the program, a disk drive unit 212, a network interface adapter 214 and a global positioning unit 222 (GPS) that is configured to determine the machine's location. Note that various embodiments will not always include all of these peripheral devices.

The disk drive unit 212 includes a computer-readable medium 216 on which is stored one or more sets of computer instructions and data structures embodying or utilized by a computer program 218 performing one or more of the methods described herein. The computer instructions and data structures may also reside, completely or at least partially, within the memory 204 and/or within the processor 202 during execution thereof by the machine 200; accordingly, the memory 204 and the processor 202 also constitute computer-readable media. Embodiments are contemplated in which the computer program 218 may be transmitted or received over the network 220 via the network interface device 214 utilizing any one of a number of transfer protocols including but not limited to the hypertext transfer protocol ("HTTP") and file transfer protocol ("FTP").

While the computer-readable medium 216 is shown in the example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing a set of instructions for execution by the machine and that cause the machine to perform any one or more of the methods described herein, or that is capable of storing data structures utilized by or associated with such a set of instructions. The term "computer-readable medium" shall accordingly be taken to include, but not be limited to, solid-state memories, optical media, flash memory, and magnetic media.

Figure 3:
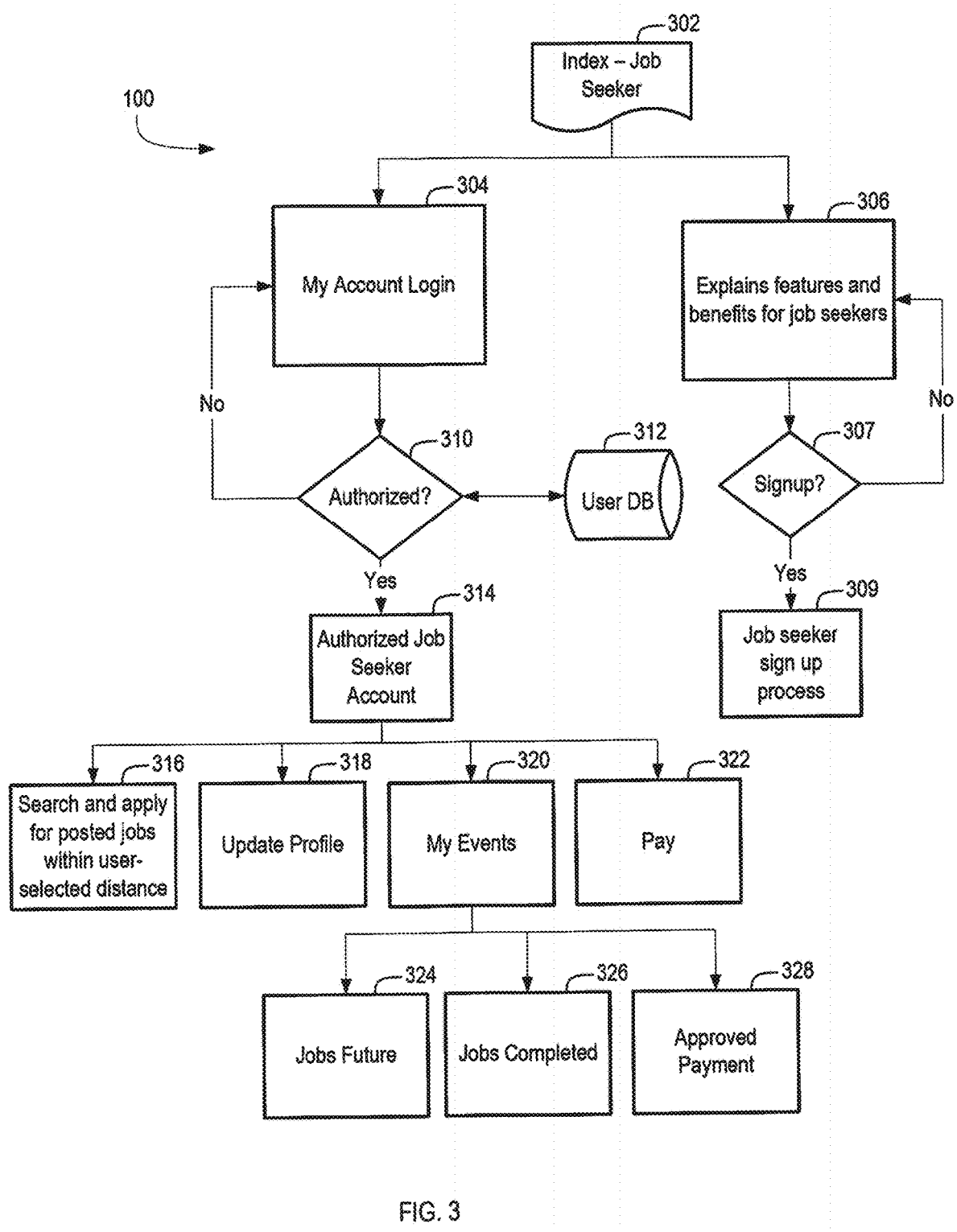
FIG. 3 is an example flow chart showing potential actions in a job seeker application or website for use with the system according to an embodiment of the present invention.

FIG. 3 depicts an exemplary diagrammatic view for a job seeker app or website according to an example embodiment of the present invention. As shown, system 100 may include an index page 302, which could be an app home screen or a landing web site on the World Wide Web. The index page 302 may allow a user, such as, a job seeker, to view and/or link to a plurality of available options on the app or site. The index page 302 may, for example, allow a job seeker to login to an existing user account at block 304. The index page 302 may also allow a job seeker to view details regarding features and benefits provided to job seekers at block 306. If the job seeker does not have an account and wishes to sign-up (block 307), the job seeker may be taken through a job seeker sign-up process at block 309.

A job seeker may, for example, elect to login at block 304 to an existing user account from the index page 302 using login information such as, for example, a username and a password. The login information may be verified at block 310 by comparing the login information with information stored in a user database 312. If the login information is not verified, the job seeker may be returned to the login screen at block 304. If, however, the login information is verified, the job seeker may be authorized to view their account. An authorized job seeker may, for example, be allowed to view his/her account and use services provided on the app or site, as indicated at block 314, such as search and apply for jobs 316, update his/her profile 318, review the user's events 320, and/or review payment information 322. If the job seeker wishes to review his/her events 320, there could be options to view jobs future (block 324) that could show the user's upcoming jobs for which the user has been accepted, jobs the user has completed (block 326) and jobs for which payment has been approved (block 328).

Figure 4:
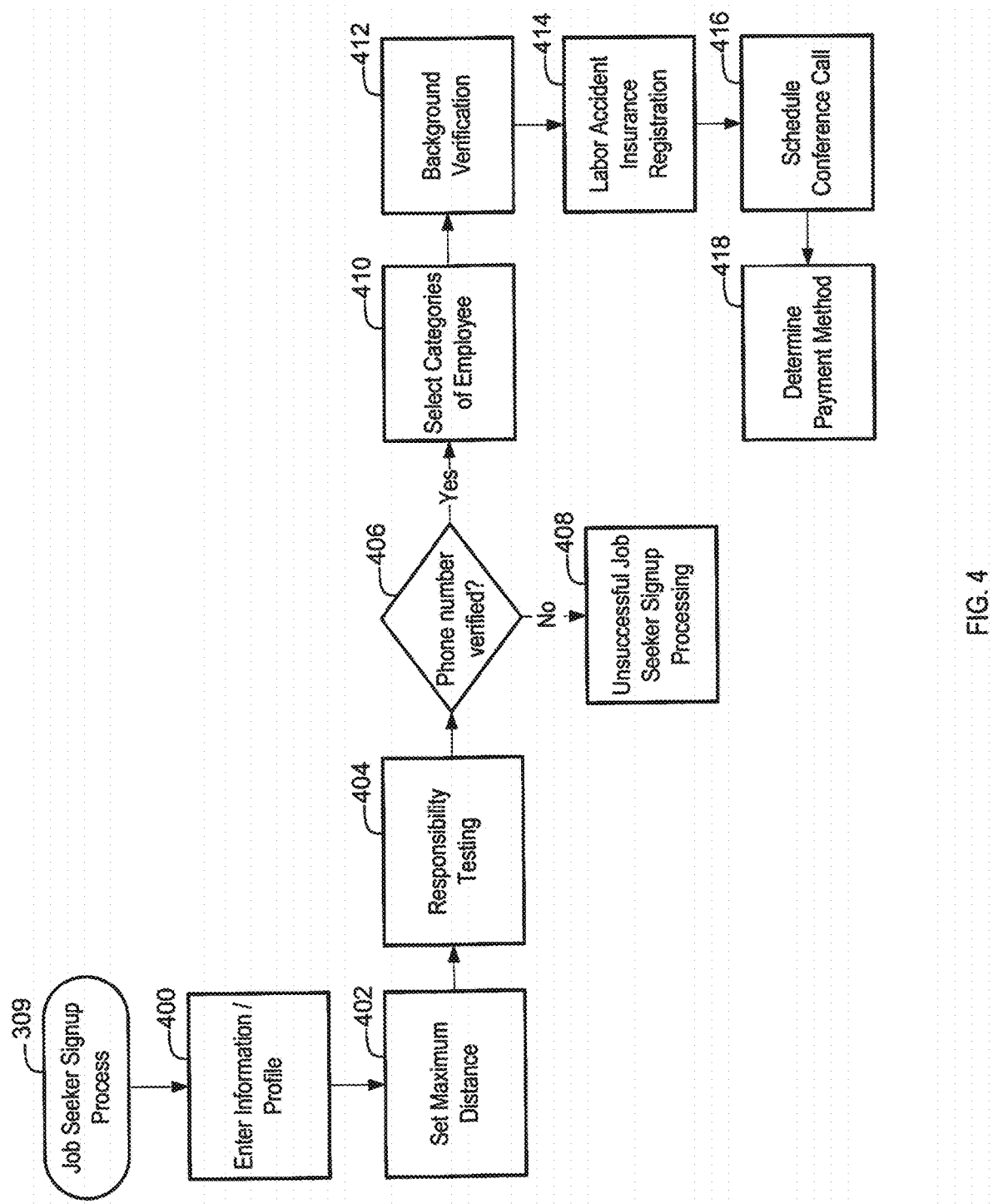
FIG. 4 is a flowchart of an example job seeker signup process according to an embodiment of the present invention.

FIG. 4 illustrates example steps that could be performed by a job seeker to setup or update his/her profile. Upon creating an account, the job seeker will enter in personal information, such as first and last name, email, phone number, etc. (block 400). In some cases, additional information could be imported from a third party social network, such as LinkedIn™ or other data source.

The user could then select a maximum distance for job postings (block 402). This would filter out job postings where work is to be performed outside the maximum distance, which would typically be determined by the GPS unit 222 on the job seeker's mobile device. This will allow the job seeker to find local job opportunities in his/her neighborhood (or immediate surroundings).

The next step in the example process shown is testing (block 404). For example, the system 100 could ask a series of questions to make sure the job seeker understands the responsibility of accepting a job. Consider an example in which there are 8 questions. In this example, there could be multiple options for answers and employees must answer the 8 questions correctly to pass this level; in case they do not fulfill the 8 correct questions, they can do it again as many times as necessary.

The process continues at decision point 406 in which a determination is made whether the job seeker's phone number has been verified. For example, a text message could be sent to the job seeker with a code to enter into the application for purposes of verification. If the phone number is not verified (block 408), in at least in some embodiments, the user is required to enter a different number to be associated with the account until verification is completed.

The next step in the example process is selecting the categories of employment for which the job seeker believes they are qualified (block 410). The categories would typically depend on the type of job postings that are available. For purposes of example only, in the restaurant industry, example categories to be presented to the user could include, but not be limited to:

Front of the House Services
   Servers
   Bartenders
   Banquet Captains
   Host-Hostess
   Event Planners
Culinary Services
   Executive Chefs
   Assistance Chefs
   Food Prep Cooks
   Line Cooks
Back of House Services
   Dishwashers
   Houseman
   Stewards
   Porters
   Housekeeping
   Coat Check
   Bar Backs The example process continues with a background check on the job seeker (block 412). For example, this could be performed by a third party criminal background check service, such as backgroundchecks.com. As part of the background check, the user could be prompted for information needed to perform a background check, such as complete legal name, date of birth and social security number. In some cases, the job seeker is required to register with an accidental occupational insurance provider (block 414). In some cases, the job seeker may be required to have a phone call with the potential employer (block 416). Finally, in the illustrative process shown in FIG. 4, the job seeker selects a payment method (block 418). For example, the job seeker could select payment into a checking account and provide sufficient information for direct deposit into the account. Other payment mechanisms, such as debit card, etc. are possible.

Figure 7:
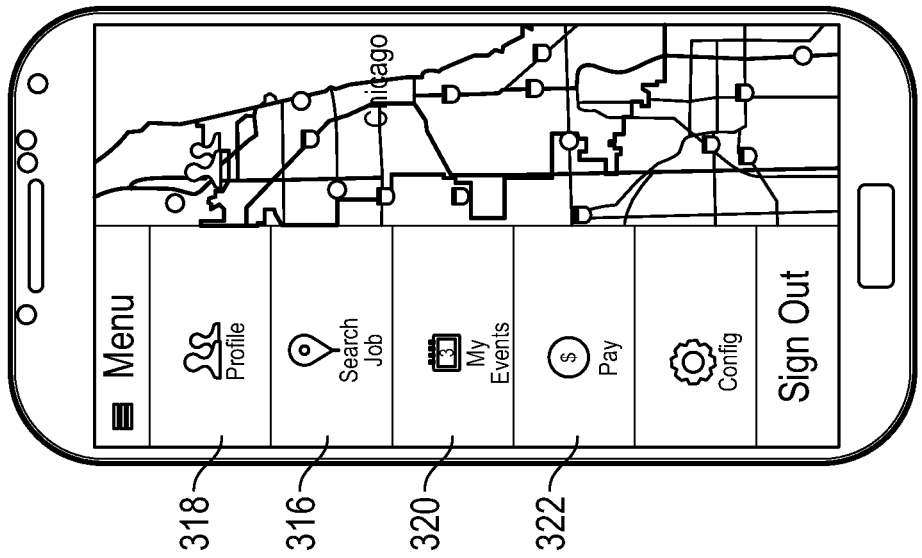

Referring to FIGS. 3 and 7, the job seeker can perform a number of functions, such as updating his/her profile create and/or update his/her profile (block 318). For example, the job seeker can summarize their personal information, full name, cell phone, email, address (City, State, Address and postal code), etc. In some embodiments, the profile will include a grade or rating, which is typically an average evaluation rating that the job seeker has received from persons who requested his/her services. For example, the rating could be in the form of stars with 5 stars being the highest rating when the employer evaluates the job seeker upon completion of a job. In some embodiments, the employer could evaluate the job seeker based on:

Cleaning
   Professionalism
   On time
   Knowledge
   Attitude

In this professional profile, the competencies of a job seeker will be described shortly, along with the functions that this person can perform, the category in which he/she is specialized. In some embodiments, the profile may include, but not be limited to:

Profile picture
   Full Name
   Email
   Address
   Phone verified
   About you.
   Experience
   Skills. The employee must define the attitudes for which he is qualified.
   Categories: Here the job seeker will have to choose the categories where he can work as described above with respect to block 410. The job seeker can add all the categories of the services offered, which will serve to get the notifications only from these categories.

Figure 8:
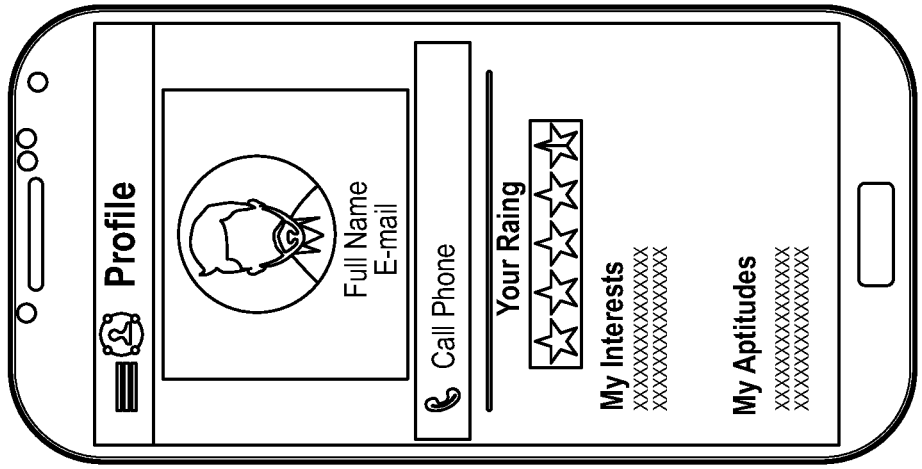

FIG. 8 is a screenshot showing an example profile of a job seeker.

Figure 9:
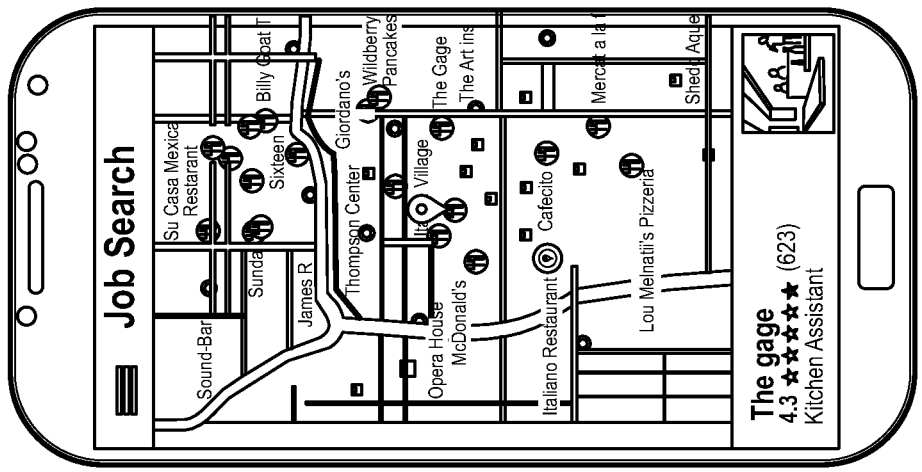
FIGS. 7-12 are screenshots showing an example user interface for a job seeker to use the system according to an embodiment of the present invention.

The job seeker can search for job postings within a user-defined distance (block 316). In this section, the job seeker will see the job postings that are near their locality (the job seeker defines the distance that they want to move)

and according to the category that the job seeker has chosen, a geographic map showing the location of the jobs can be seen by the user. In some embodiments Google Maps™ could be used for the map engine. FIG. 9 is an example screenshot showing a geographical map with vacancies. Job locations will appear where they have vacancies, but the moment a company posts a vacancy, which has the category chosen by the job seeker, the system will notify the job seeker that a job is available for the employee to verify. In some embodiments, the job seeker will also have the option of being able to find available jobs in places farthest from his/her location, once the job seeker has selected a job, he/she can click to see the complete information of the job. In some cases, upon setting a maximum distance, the job seeker could receive automated messages regarding job postings within the maximum distance that meet criteria for a job posting that the job seeker has searched.

Figure 10:
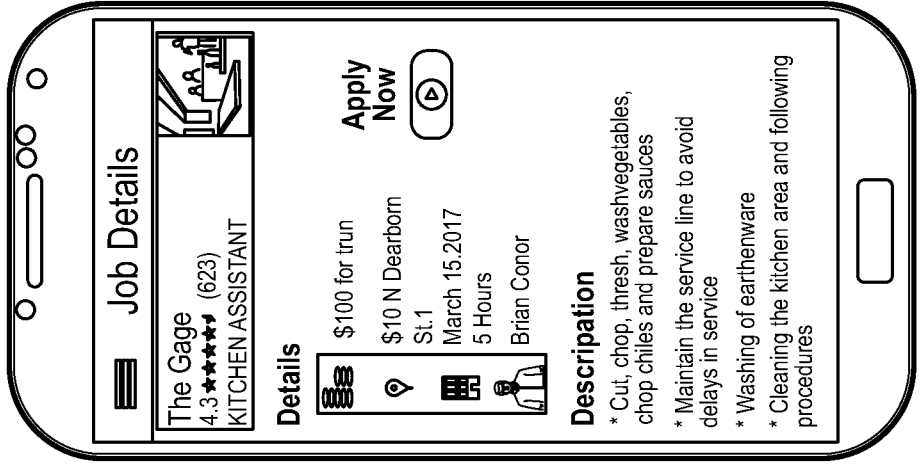

In the details of the job, the name of the company that is offering the job and the position that is being offered will appear. If the job seeker selects a job, the system will send the job seeker the details of the job, such as the amount to be paid per shift or day, the address where the job will be, the job start date and job end date, the work, start time, end time and person with whom the job seeker must contact once he/she reaches employment. In the job description section, all the tasks or activities that will be performed in the job will be detailed. In case the job seeker has the availability of the days and hours indicated by the work and accepts the requirements of the employment, the job seeker may apply for the vacancy. The system will have the ability to choose the best job seekers available. FIG. 10 shows an example screenshot upon a job seeker selecting a job posting from the geographical map shown in FIG. 9.

Once the job seeker has applied for the vacancy, he/she must wait for a notification that he/she is accepted for employment. In some embodiments, the length of time until the event occurs will determine the length of time that the job seekers will need to wait until notification of whether he/she is accepted. For example, if the job posting is for an event that is more than 1 week in advance: the user could be notified in 24 hours if he/she is accepted. In some cases, if there is a length of time in excess of a predetermined minimum, the system 100 will automatically select the job seekers based on their respective ratings. Continuing the example above, at 24 hours, the system could review the best rating and send notifications of acceptance to the number of candidates requested by the company. In any event, the job seeker could receive a message that they have been accepted or rejected for a shift or job. Likewise, if the employer cancels a shift or job for which the job seeker has applied, the job seeker could receive a message indicating that the job or shift has been cancelled.

For job postings with work occurring in less time than a predetermined time period, the system could be configured to automatically accept job seekers regardless of rating. For example, if the job posting is for an event that is in from 1 week to 48 hours, the job seeker could be notified at 4 hours if he/she is accepted. For example, at 4 o'clock, the system will review the best rating and send the accepted notifications to the number of candidates requested by the company. If time passes and the number of candidates required by the company has not yet been completed, the vacancy re-sends notifications to employees.

Figure 11:
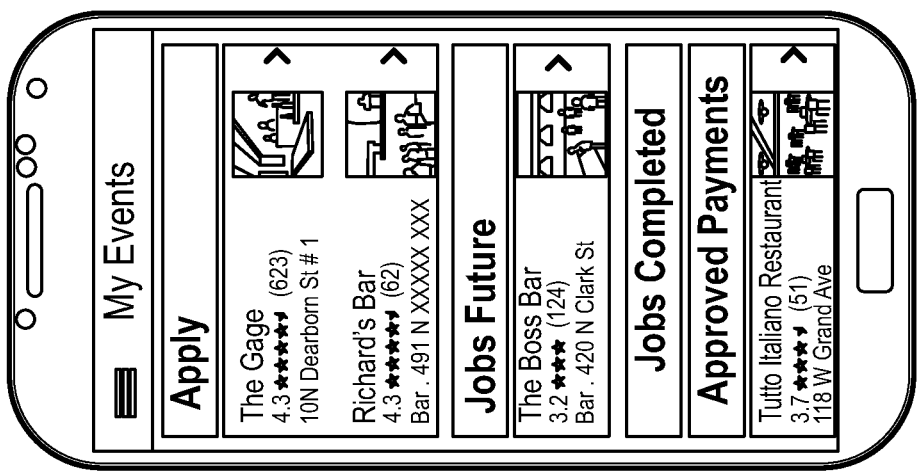

The job seeker can view information regarding his/her events for which he/she has been accepted (block 320). In some cases, the job seeker can archive posted jobs, which hides the jobs from view, but could be accessed later if wanted. Depending on the circumstances, conversations regarding job postings could be organized in a fashion desired by the job seeker. FIG. 11 is an example screenshot with an interface by which the job seeker could view his/her events. In the embodiment shown, the events section (block 320) is divided into:

Apply. Here the job seeker will see the jobs to which he/she has applied, but which are not yet confirmed; when the job seeker receives a notification that he/she is accepted, the job will be automatically moved to jobs future, if more than 24 hours (or other predetermined time period) have passed, the vacancy will be automatically deleted.

Jobs future. This section identifies the jobs for which the job seeker has already accepted. The application will send notifications when one day is left for the job, as a reminder. With 24 hours left for the event, the job seeker will have to confirm if the event is to be attended by the company to confirm its employees, in case the job seeker cannot attend or has left some commitment, the event can be canceled so that it can be returned to post and get another candidate.

Jobs completed. This section identifies the jobs that the job seeker has completed, at the time of entry and exit every day that the job is required.

Approved payment. This section identifies the jobs where the company has already approved the job seeker's service. This will be the sum of the payments the job seeker will receive at the end of 3 business days (or other payment period).

Figure 12:
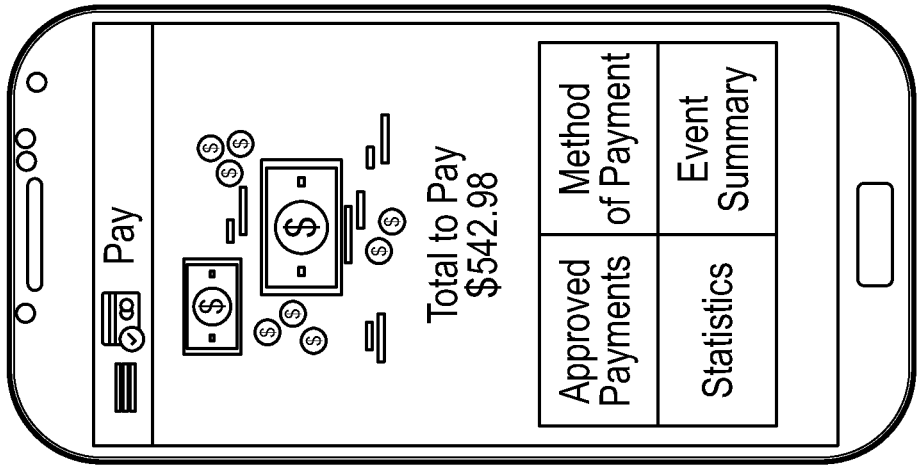

The job seeker is able to review information regarding payment (block 322). FIG. 12 shows an example screenshot in which the job seeker can review information about his/her payments.

Figure 5:
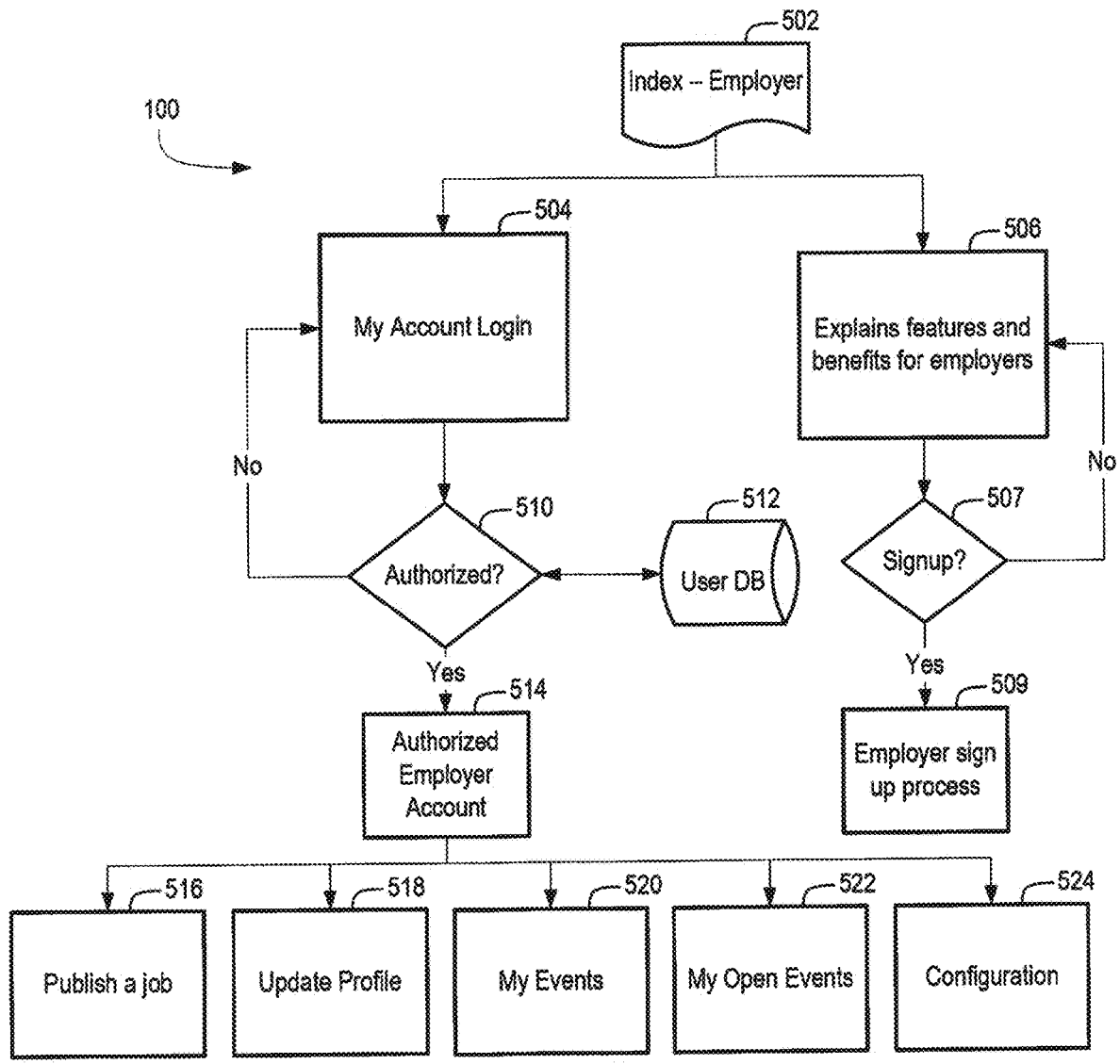
FIG. 5 is an example flow chart showing potential actions in an employer application or website for use with the system according to an embodiment of the present invention.

The employer can access functionality for posting jobs (and other actions) via an employer app or website. FIG. 5 depicts an exemplary diagrammatic view for an employer app or website according to an example embodiment of the present invention. As shown, system 100 may include an index page 502, which could be an app home screen or a landing web site on the World Wide Web. The index page 502 may allow a user, such as, an employer, to view and/or link to a plurality of available options on the site. The index page 502 may, for example, allow an employer to login to an existing user account at block 504. The index page 502 may also allow an employer to view details regarding features and benefits provided to employers at block 506. If the employer does not have an account and wishes to sign-up (block 507), the employer may be taken through an employer sign-up process at block 509.

An employer may, for example, elect to login at block 504 to an existing user account from the index page 502 using login information such as, for example, a username and a password. The login information may be verified at block 510 by comparing the login information with information stored in a user database 512. If the login information is not verified, the employer may be returned to the login screen at block 504. If, however, the login information is verified, the employer may be authorized to view their account. An authorized employer may, for example, be allowed to view his/her account and use services provided on the app or site, as indicated at block 514, such as post jobs 516, update the employer's profile 518, review the employer's events 520, review the employer's open events 522 and/or update configuration settings 524.

With regard to updating the employer's profile 518, the employer should fill out information about the company to be more attractive for job seekers, and let them know that it is a serious company and be able to identify it quickly. The information completed by the employer could include, but is not limited to:

Company logo
    Name of the company
    Background image of the place
    Description
    Schedule
    Address
    City
    State
    Phone
    Zip code The employer's profile includes a profile contact. This section will be the profile of the company contact and will contain information in general. The job seekers will not be able to access the profiles of the contacts. In some embodiments, the employer may block other third parties from viewing the profile or otherwise interacting with the employer. This is information only for the company (it is the only information that can enter the contacts of the company). The following are examples of information that could be provided for the employer's profile contact:

Full name
    Cell phone.
    Position
    Email

The employer's app or website includes a section in which the type of payment for each event is selected. Typically, the employer will pay this to a third party service that will distribute payment to the job seekers that performed the work.

Figure 6:
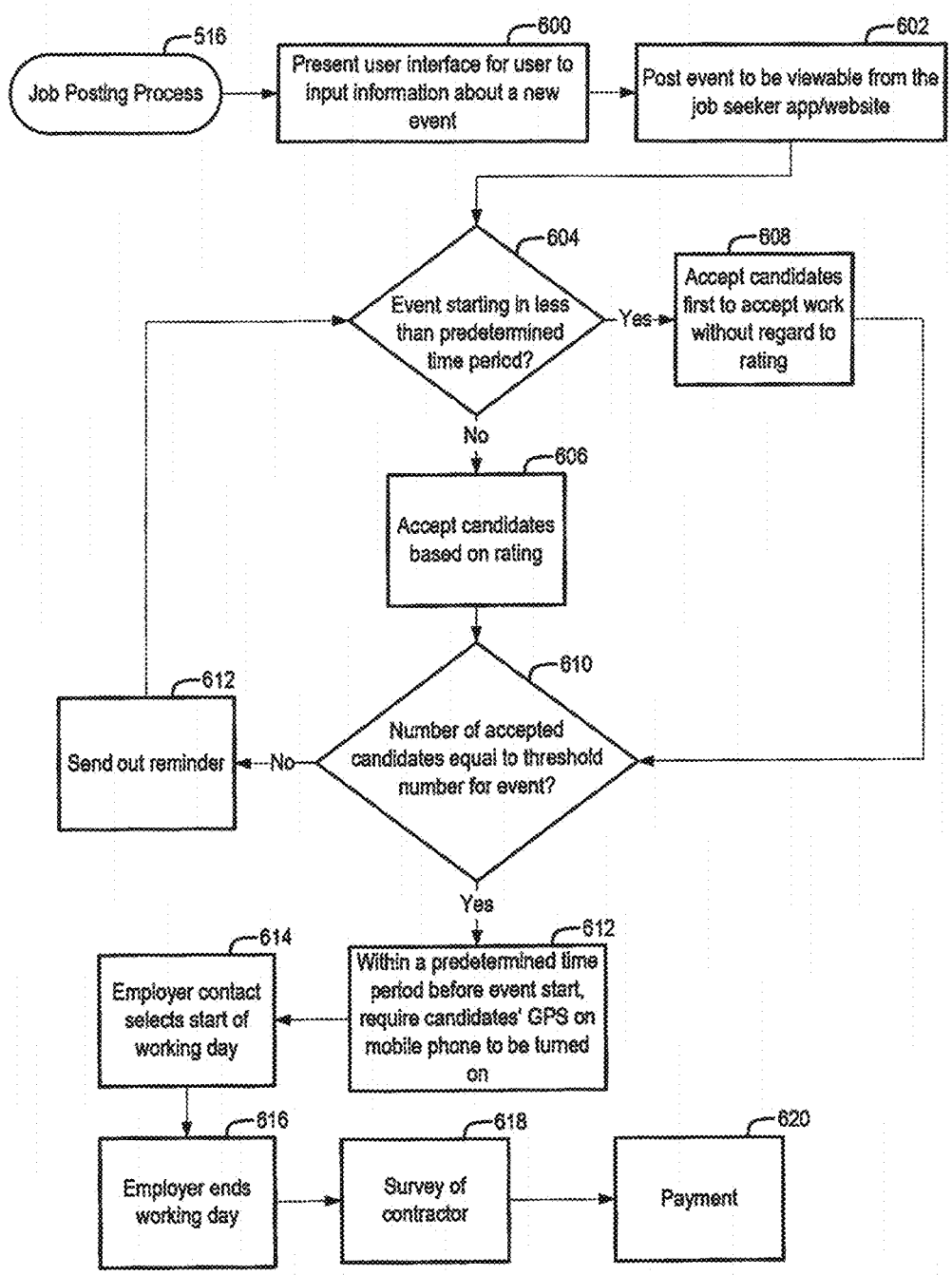
FIG. 6 is a flowchart of an example job posting process according to an embodiment of the present invention.
Figure 14:
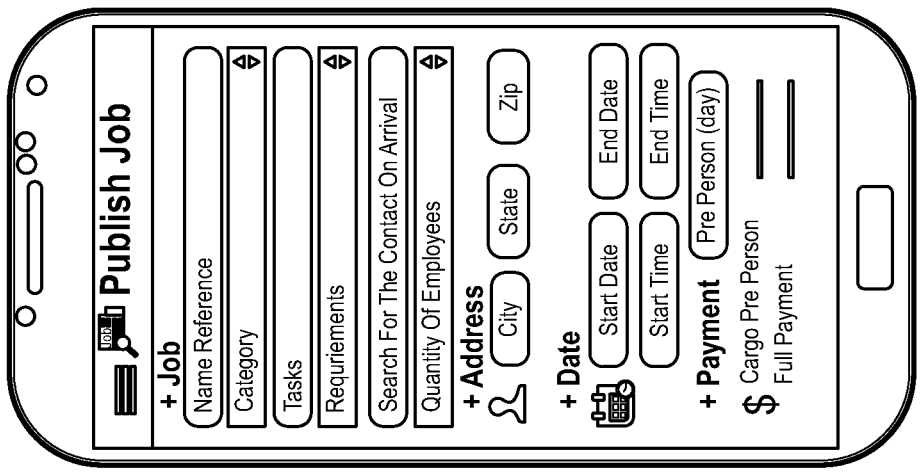
Figure 13:
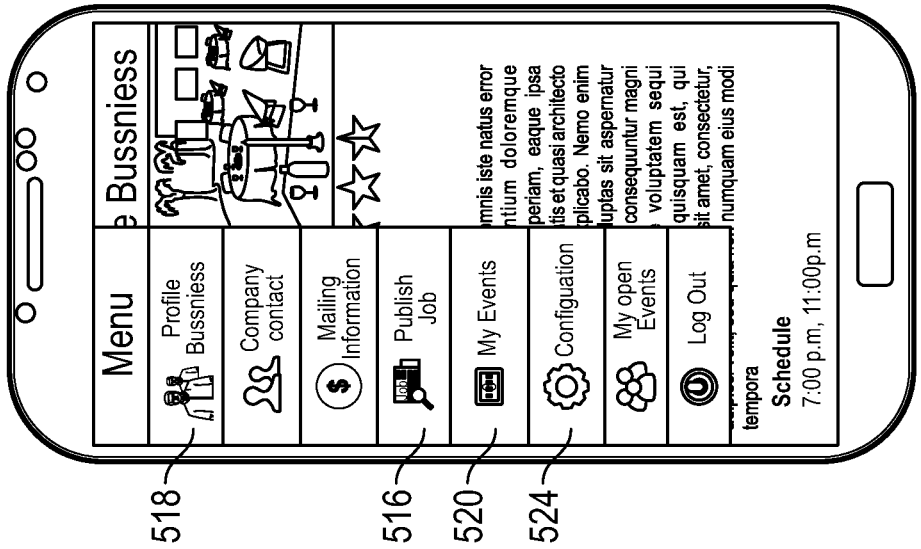
Figure 18:
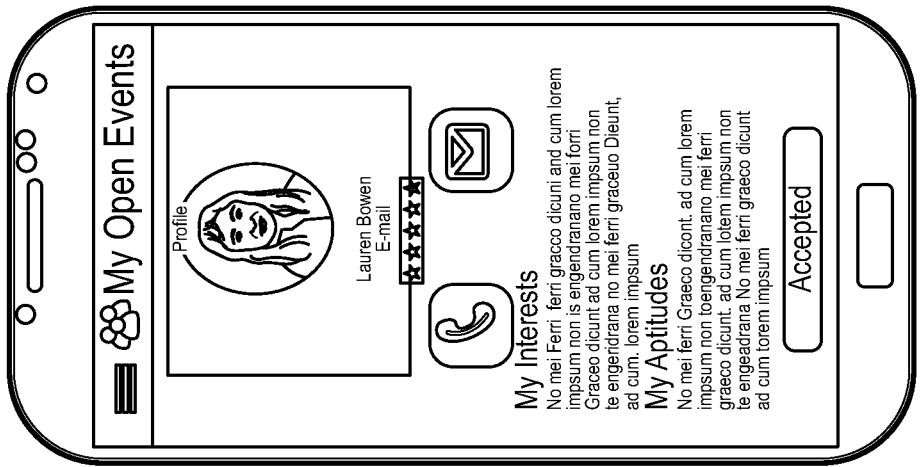
Figure 17:
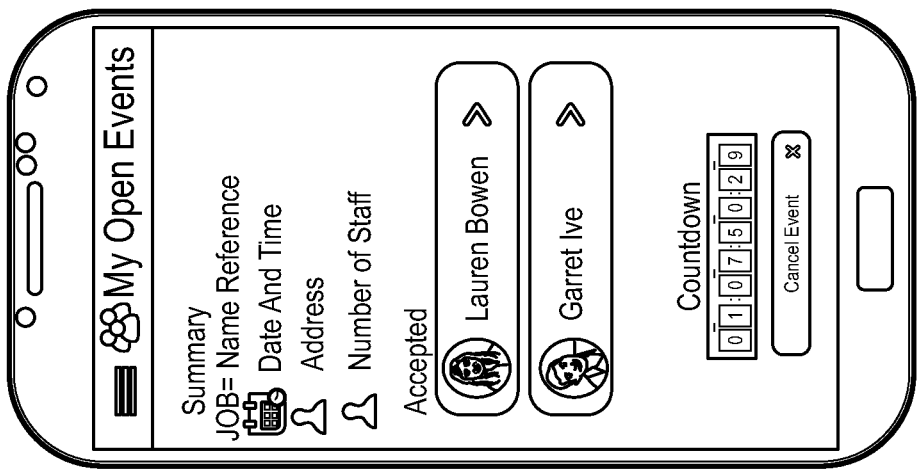
Figure 16:
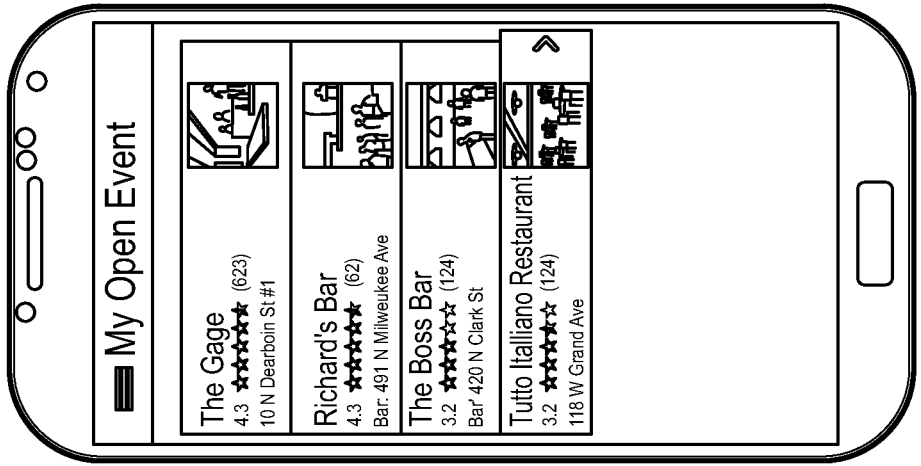

FIG. 6 illustrates example steps that could be performed by an employer to post a job listing to the system 100. In some embodiments, the app or website will present the employer with the ability to include the following non-limiting information for a job posting (block 600) that can be viewable by a job seeker (block 602). In some cases, an employer could copy a previous listing or template posting and publish it with new dates to save time. In some embodiments, when a job seeker applies for a job posting, the employer could receive a notification that a new candidate has applied for a specific shift with details about the job posting for which the job seeker applied. FIG. 14 is an example screenshot showing a user interface for inputting information for posting a job.

Reference of employment. Name of employment.
    Category
        Front of the House Services
    Servers
    Bartenders
    Banquet Captains
    Host-Hostess
    Event
    Planners
    Culinary Services
        Executive Chefs
        Assistance Chefs
        Food Prep Cooks
        Line Cooks
    Back of House Services
        Dishwashers
        Houseman
        Stewards
        Porters
        Housekeeping
        Coat Check
        Bar Backs
    Tasks to be performed: The employer will have to define, in the form of a paragraph, tasks to be carried out on the job.
    Requirements: Requirements of the job will have to add the company requirement by request, and go giving adding it to add a new one.
    Contact: Name of the person to contact when starting work
    Number of Contractors. Number of contractors to request
    Employment address: address
    Event date
    Start date:

Start time: _____ End time: _____
    Total hours: _____ this number will appear in automatic Total payment
    Payment per day: The company will add the amount per employee.
    Charge per day: 35% of what the company will pay will be automatically added
    Example:
        Day 1 . . . number of employees 1 (payment×day)+charge=50
        Day 2 . . . quantity employed 2 (payment×day)+charge=100 Total=150
    In automatic will appear the charge per person and the total to be paid by all contractors hired, the contractor will be able to define the time in which the service will be paid, with a percentage entering depending the time that it took to pay.

In some embodiments, the employer can post two types of work, normal work and last call work. Normal work is work posted more than a predetermined time before the start of an event, such as more than 48 hours before the start time; last call work is work posted less than the predetermined time before the start of an event—urgent events that need to be filled in a rushed time table. When an employer posts a job opening, the employer will receive a message that the new job has been published as confirmation. In some embodiments, the employer may register all dates with shifts and require up to a maximum of a designated number of days (e.g., 7 days) from the first day of work. For example, Monday 7, Wednesday 9 and Friday 11.

In some embodiments, a determination is made on the type of work as to how long before the event start date (block 604). In some cases, normal work is that posted with more than 48 hours to the start of the event. If the work is posted more than 1 week in advance of the event start date, the job seeker is notified in 24 hours if it is accepted. At 24 hours, the system will review the best rating and send notifications of acceptance to the number of candidates requested by the company (block 606). From 1 week to 48 hours, the job seeker is notified at 4 hours if they are accepted. At 4 o'clock, in some embodiments, the system will review the best rating and send the accepted notifications to the number of candidates requested by the company. If the posting is for last call work, the first candidates to apply for work are accepted without regard to rating (block 608). If time passes and the number of candidates required by the company has not yet been completed (block 610), a vacancy reminder notification is sent to job seekers (612). In some cases, the employer can cancel a shift or a job and the candidates that have accepted will be notified that the shift or job has been cancelled. In some embodiments, a company can specifically accept job seekers instead of the system programmatically choosing the candidates for the shift.

In some embodiments, the employer app/website may include a summary of all jobs that have been published (block 520). In this section, the employer can see a summary of all the jobs they have published. In some cases, the information will include, but not be limited to:

Event reference name
Type of job: Normal or last call
Date of the event
Category or position
Contact name
Name (s) of the participating staff.
Pay per day per contractor
Full payment
Date of payment (only approved works will have date of payment)
Status: completed work, missing to approve payment, active work, approved jobs.
Sum of payments.

Figure 15:
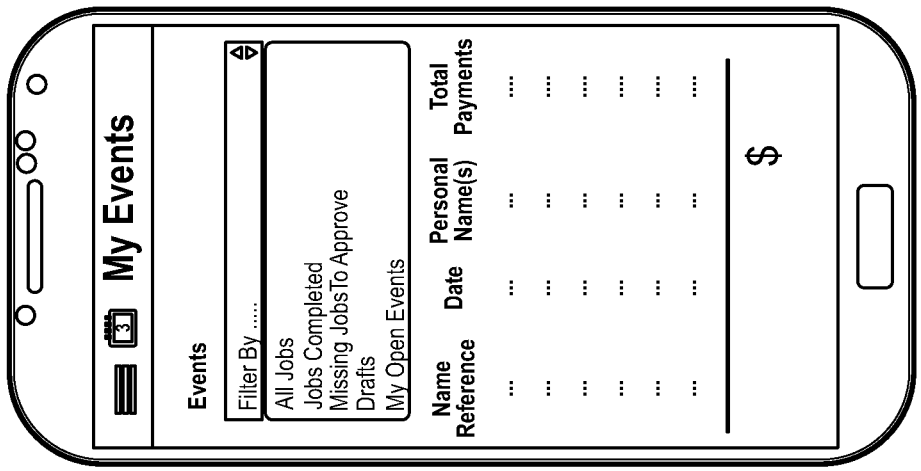
FIGS. 13-21 are screenshots showing an example user interface for an employer to use the system according to an embodiment of the present invention.

In some embodiments, event information can be filtered by all jobs, completed jobs (but that are not yet approved), missing jobs for approving payment, future jobs, approved jobs. A complete report can be obtained in PDF or can be sent to the mail of the company. FIG. 15 is an example screenshot showing a filtering of events by an employer.

If there is any notice of the job that has not been read or seen by the employer, the work will be highlighted in a section of the app/website, clicking each event will be able to access each event. In this section, the employer will see a summary of upcoming open events (e.g., job reference name, date and time, address, number of staff you requested). As discussed, the system will accept the best staff available. The staff accepted will appear in the personal section accepted. Examples of screenshots with these features are shown in FIGS. 16-19. The employer can view the profile of the contractor by clicking on the user's name. The employer can also make a call to the contact or send a message so they can communicate with the contractor(s). Once the system selects the best available staff, the status of the job will be displayed for each employee, such as:

Accepted
Start
End
Approve payment

Figure 20:
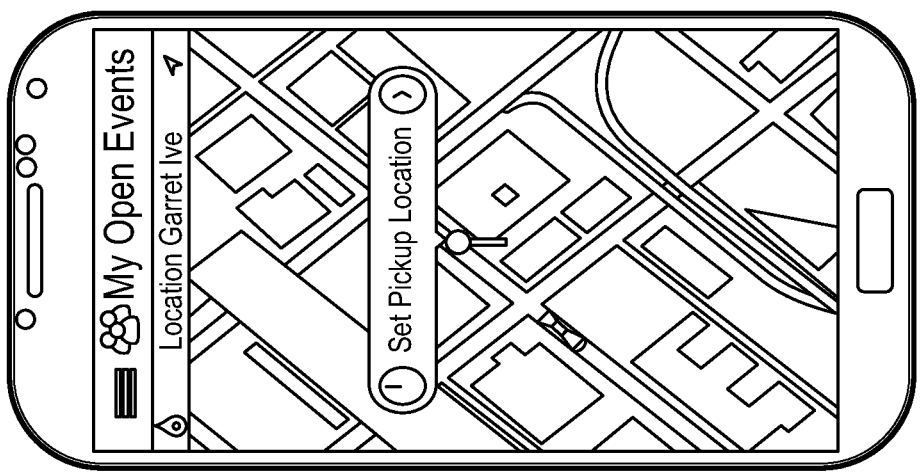
Figure 19:
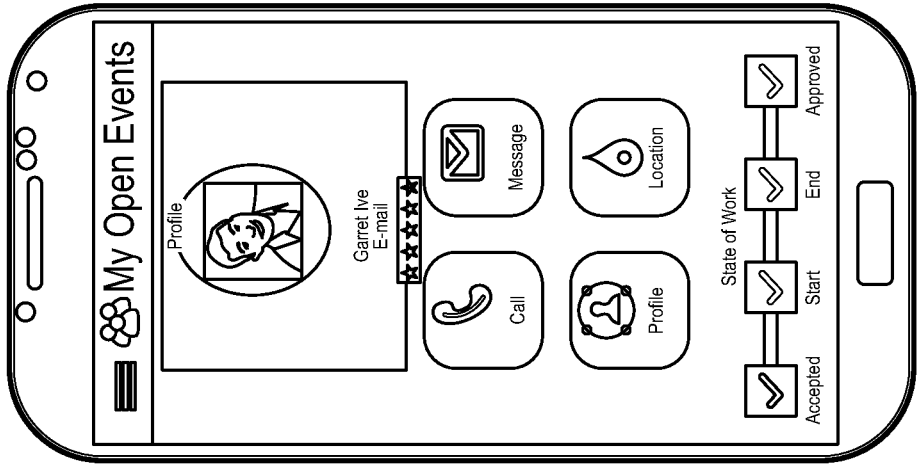

At all times, the employer will be able to communicate with the user. With 2 hours to start the event, the system will notify the contractor that he/she must activate his GPS and the employer contact can check if the job seeker is already on the way (block 612). In some cases, an alert is made on the job seeker's mobile device a designated time period before a shift starts. For example, an alert may appear on the job seeker's device one hour before starting a shift that "Job Name" starts at "start time." FIG. 20 illustrates an example screenshot showing a location of a job seeker on the employer app/website. For example, when the employer selects to know a job seeker's location, the job seeker's mobile device could display a message such as: "Company Name" wants to know your location. Do you want to allow access to the location of your device?

Typically, the contractor will have to arrive 15 min before the start time of the work, and will have to report with the employer contact. The employer contact will then click on "start" to indicate that the user is starting their working day (block 614). At the end of the working day, the worker will have to notify his withdrawal to the contact of the company and he must click on end (block 616). By clicking on end, the employer will take a survey (block 618), such as by selecting 1 to 5 stars for each item being evaluated. At the end of the survey, the employer will click on approve payment (block 620). In some cases, companies can add overtime to employees right on the spot if needed or, depending on the circumstances, only if the employee agrees to continue working the next day. Whether the job seeker accepts or rejects the overtime, can be displayed/sent in a message to the employer. That time will be determined by the company and agreed by the job seeker. In some cases, when employers and employees finish a shift (per day) and the employee clicks on completed, a message can be sent that "Name job" has been completed by "Employee name." When a shift starts (per day) and the job seeker clicks on start, a message could be sent that "Name job" has been started by "Employee name." When a shift ends (per day) and users have not clicked on end job, a message could be sent "Job name" has been completed by "Employee name," click, "end job." When a shift starts (per day) and the employer clicks start shift, a message could be displayed/sent "Employee name" started "Job name."

Figure 21:
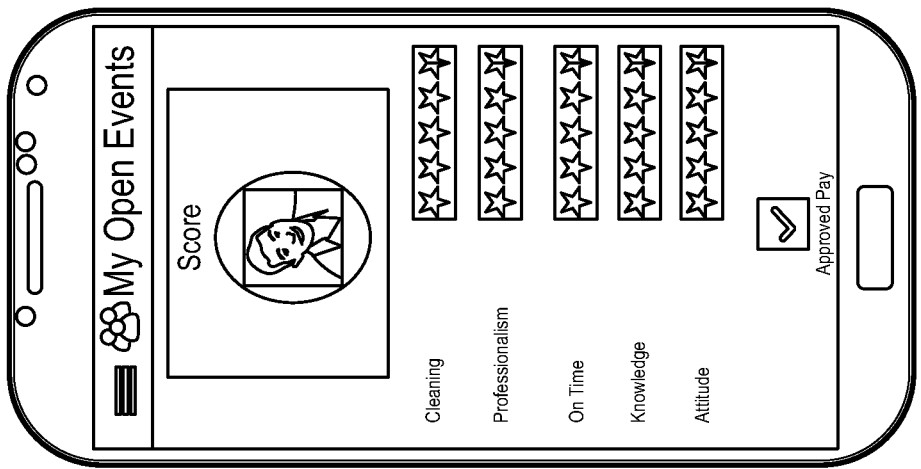

FIG. 21 illustrates an example interface for the employer to complete a survey and select to approve payment. In some cases, after collecting payment from an employer, the employer could receive a message such as "We have charged your payment for the vacancy 'job name.'" The job seeker could also receive a corresponding message such as "We have sent your payment for 'Job Name'; verify your Stripe account in the 'payment info' section."

This system is not limited to the restaurant industry. It may be used within any industry that relies on hiring temporary labor or other types of labor.

EXAMPLES

Illustrative examples of the method and system disclosed herein are provided below. An embodiment of the method and system may include any one or more, and any combination of, the examples described below.

Example 1 is a computer-implemented method for operating one or more servers to match time-sensitive job opportunities with job seekers. The method comprising the step of determining a current location of a job seeker, wherein the job seeker is associated with one or more job qualifications. In response to receiving a job search request including a maximum geographic distance from the job seeker and a work availability time period, the method includes the step of searching the one or more servers for job postings that satisfy a search criteria of: (1) the maximum geographic distance from the job seeker; (2) a start time and an end time of job postings within the work availability time period; and (3) the one or more job qualifications. A presentation is generated on a display of a computing device of the job seeker, the presentation including a map showing locations of the job postings satisfying the search criteria while concurrently providing a user interface from which the job seeker can apply for one or more of the job postings. In response to a triggered job fulfillment process for an upcoming job posting, the one or more servers programmatically assigning one or more job seekers to the upcoming job posting based, at least in part, on a service reputation rating of those job seekers, wherein the service reputation rating represents feedback from one or more employers on a job seeker. The method includes the step of communicating, using the one or more servers, an acceptance notification message to job seekers assigned to the upcoming job posting. Prior to a start time for the job posting, a presentation is generated on a display of a mobile computing device of an employer associated with the upcoming job posting, the presentation including a map that depicts transit progress information, including a current geographic location of one or more job seekers assigned to the upcoming job posting based on a global positioning system (GPS) resource of respective mobile computing devices of job seekers assigned to the upcoming job posting, wherein the presentation includes a user interface for the employer to select a start time and an end time based on arrival and withdrawal times of job seekers. The method includes determining a payment for one or more job seekers based, at least in part, on the start time and the end time selected on the mobile computing device of the employer.

In Example 2, the subject matter of Example 1 is further configured to include enabling the employer to provide a feedback using the user interface on the mobile computing device of the employer in order to affect the service reputation rating of a job seeker.

In Example 3, the subject matter of Example 2 is further configured such that the user interface enables the employer to select feedback ratings relating to one or more of: (1) cleaning, (2) professionalism, (3) timeliness, (4) knowledge, and (5) attitude.

In Example 4, the subject matter of Example 2 is further configured such that the service reputation rating is available to other employers.

In Example 5, the subject matter of Example 1 is further configured such that the transit progress information includes an estimated time of arrival that is provided on the mobile computing device of the employer.

In Example 6, the subject matter of Example 1 is further configured such that the payment is determined automatically in response to receiving the start time and the end time selected on the mobile computing device of the employer.

In Example 7, the subject matter of Example 6 is further configured to include obtaining funds for the payment using an account of the employer.

In Example 8, the subject matter of Example 7 is further configured to include distributing at least a portion of the funds received from the employer to a job seeker corresponding to the payment.

In Example 9, the subject matter of Example 1 is further configured such that the triggered job fulfillment process occurs based on a designated amount of time until the upcoming job posting.

In Example 10, the subject matter of Example 1 is further configured such that the current location of the job seeker is determined by a mobile computing device of the job seeker based on data determined with a global positioning system (GPS) resource of the mobile computing device.

In Example 11, the subject matter of Example 1 is further configured such that the user interface from which the job seeker can apply for one or more of the job postings includes a vetting feature for determining whether the job seeker is qualified for a particular job posting.

In Example 12, the subject matter of Example 1 is further configured such that the user interface from which the job seeker can apply for one or more of the job postings includes a background feature that performs a criminal background check on the job seeker.

In Example 13, the subject matter of Example 1 is further configured such that the user interface from which the job seeker can apply for one or more of the job postings include a phone verification feature that performs is configured to verify a phone number of the job seeker.

In Example 14, the subject matter of Example 1 is further configured such that the acceptance notification message includes one or more of: (1) an address where work will occur for the upcoming job posting, (2) a start date and end date for the upcoming job posting, (3) a start time and an end time for the upcoming job posting; and (4) contact information for whom the job seeker should contact upon reaching a job location.

Example 15 is a system for matching time-sensitive job opportunities with job seekers. In some embodiments, the system includes one or more network interfaces to communication with a computing device of each job seeker and with a computing device of each employer. The system also includes one or more processors coupled to the one or more network interfaces, the one or more processors to: determine a current location of a job seeker, wherein the job seeker is associated with one or more job qualifications; in response to receiving a job search request including a maximum geographic distance from the job seeker and a work availability time period, search for job postings that satisfy a search criteria of: (1) the maximum geographic distance from the job seeker; (2) a start time and an end time of job postings within the work availability time period; and (3) the one or more job qualifications; generate a presentation on a display of the computing device of the job seeker, the presentation including a map showing locations of the job postings satisfying the search criteria while concurrently providing a user interface from which the job seeker can apply for one or more of the job postings; trigger a job fulfillment process for an upcoming job posting by programmatically assigning one or more job seekers to the upcoming job posting based, at least in part, on a service reputation rating of those job seekers; communicate an acceptance notification message to job seekers assigned to the upcoming job posting; generate, prior to a start time for the job posting, a presentation on a display of the computing device of an employer associated with the upcoming job posting, the presentation including a map that depicts transit progress information, including a current geographic location of one or more job seekers assigned to the upcoming job posting based on a global positioning system (GPS) resource of respective mobile computing devices of job seekers assigned to the upcoming job posting, wherein the presentation includes a user interface for the employer to select a start time and an end time based on arrival and withdrawal times of job seekers; and determine a payment for one or more job seekers based, at least in part, on the start time and the end time selected on the mobile computing device of the employer.

In Example 16, the subject matter of Example 15 is further configured such that the one or more processors enable the employer to provide a feedback using the user interface on the mobile computing device of the employer in order to affect the service reputation rating of a job seeker.

In Example 17, the subject matter of Example 16 is further configured such that the user interface enables the employer to select feedback ratings relating to one or more of: (1) cleaning, (2) professionalism, (3) timeliness, (4) knowledge, and (5) attitude.

In Example 18, the subject matter of Example 16 is further configured such that the service reputation rating is available to other employers.

In Example 19, the subject matter of Example 15 is further configured such that the transit progress information includes an estimated time of arrival that is provided on the mobile computing device of the employer.

In Example 20, the subject matter of Example 15 is further configured such that the one or more processors determine payment automatically in response to receiving the start time and the end time selected on the mobile computing device of the employer.

Although the present disclosure has been described with reference to particular means, materials and embodiments, from the foregoing description, one skilled in the art can easily ascertain the essential characteristics of the invention and various changes and modifications may be made to adapt the various uses and characteristics without departing from the spirit and scope of the invention.

What is claimed is:

1. A computer-implemented method for operating one or more servers to match time-sensitive job opportunities with job seekers, the method comprising:
    determining, using one or more servers, a current location of one or more job seekers, wherein the one or more job seekers are associated with one or more job qualifications;
    in response to receiving a job search request including a maximum geographic distance from the one or more job seekers and a work availability time period, searching, using the one or more servers, the one or more servers for job postings that satisfy a search criteria of: (1) the maximum geographic distance from the one or more job seekers; (2) a start time and an end time of job postings within the work availability time period; and (3) the one or more job qualifications;
    generating, using the one or more servers, a presentation on a display of a computing device of the one or more job seekers, the presentation including a map showing locations of the job postings satisfying the search criteria while concurrently providing a user interface with a job seeker selectable portion to apply for one or more of the job postings;
    in response to a triggered job fulfillment process for an upcoming job posting, the one or more servers programmatically assigning job seekers to the upcoming job posting based, at least in part, on a service reputation rating of those job seekers, wherein programmatically assigning the one or more job seekers to the upcoming job posting is triggered in response to an amount of time remaining until the upcoming job posting being less than a threshold time remaining until the upcoming job posting, wherein the service reputation rating represents feedback from one or more employers on the one or more job seekers;
    communicating, using the one or more servers, an acceptance notification message to the one or more job seekers assigned to the upcoming job posting;
    generating, prior to a start time for the job posting, using the one or more servers, a presentation on a display of a mobile computing device of an employer associated with the upcoming job posting, the presentation including a map that depicts transit progress information, including a current geographic location of the one or more job seekers assigned to the upcoming job posting based on a global positioning system (GPS) resource of respective mobile computing devices of the one or more job seekers assigned to the upcoming job posting and an estimated time of arrival for respective job seekers that is provided on the mobile computing device of the employer, wherein the presentation includes a user interface for the employer to select a start time and an end time based on arrival and withdrawal times of the one or more job seekers; and
    determining, using the one or more servers, a payment for the one or more job seekers based, at least in part, on the start time and the end time selected on the mobile computing device of the employer.

2. The method of claim 1, further comprising enabling, using the one or more servers, the employer to provide a feedback using the user interface on the mobile computing device of the employer in order to affect the service reputation rating of the one or more job seekers.

3. The method of claim 2, wherein the user interface, using the one or more servers, enables the employer to select feedback ratings relating to one or more of: (1) cleaning, (2) professionalism, (3) timeliness, (4) knowledge, and (5) attitude.

4. The method of claim 2, wherein the service reputation rating is available to other employers, using the one or more servers.

5. The method of claim 1, wherein the payment is determined automatically in response to receiving the start time and the end time selected on the mobile computing device of the employer.

6. The method of claim 5, further comprising obtaining funds, using the one or more servers, for the payment using an account of the employer.

7. The method of claim 6, further comprising distributing, using the one or more servers, at least a portion of the funds received from the employer to the one or more job seekers corresponding to the payment.

8. The method of claim 1, wherein the current location of the one or more job seekers is determined by one or more mobile computing devices of respective job seekers of the one or more job seekers based on data determined with a global positioning system (GPS) resource of the mobile computing devices.

9. The method of claim 1, wherein the user interface includes a vetting portion to determine whether the one or more job seekers are qualified for a particular job posting.

10. The method of claim 1, wherein the user interface includes a background portion to perform a criminal background check on the one or more job seekers.

11. The method of claim 1, wherein the user interface includes a phone verification portion to verify a phone number of the one or more job seekers.

12. The method of claim 1, wherein the acceptance notification message includes one or more of: (1) an address where work will occur for the upcoming job posting, (2) a start date and end date for the upcoming job posting, (3) a start time and an end time for the upcoming job posting; and (4) contact information for whom the job seeker should contact upon reaching a job location.

13. A system for matching time-sensitive job opportunities with job seekers, the system comprising:
    one or more network interfaces to communicate with a mobile computing device of each job seeker of one or more job seekers and with a mobile computing device of each employer; and one or more processors coupled to the one or more network interfaces, the one or more processors to:

determine, using the one or more processors, a current location of the one or more job seekers, wherein the one or more job seekers are associated with one or more job qualifications;

in response to receiving a job search request including a maximum geographic distance from the one or more job seekers and a work availability time period, search, using the one or more processors, for job postings that satisfy a search criteria of: (1) the maximum geographic distance from the one or more job seekers; (2) a start time and an end time of job postings within the work availability time period; and (3) the one or more job qualifications;

generate, using the one or more processors, a presentation on a display of the mobile computing device of the one or more job seekers, the presentation including a map showing locations of the job postings satisfying the search criteria while concurrently providing a user interface with a job seeker selectable portion to apply for one or more of the job postings;

trigger, using the one or more processors, a job fulfillment process for an upcoming job posting by programmatically assigning job seekers to the upcoming job posting based, at least in part, on a service reputation rating of those one or more job seekers, wherein programmatically assigning the one or more job seekers to the upcoming job posting is triggered is response to an amount of time remaining until the upcoming job posting being less than a threshold time remaining until the upcoming job posting;

communicate, using the one or more processors, an acceptance notification message to the one or more job seekers assigned to the upcoming job posting;

generate, prior to a start time for the job posting, using the one or more processors, a presentation on a display of the mobile computing device of an employer associated with the upcoming job posting, the presentation including a map that depicts transit progress information, including a current geographic location of the one or more job seekers assigned to the upcoming job posting based on a global positioning system (GPS) resource of respective mobile computing devices of the one or more job seekers assigned to the upcoming job posting, wherein the presentation includes a user interface for the employer to select a start time and an end time based on arrival and withdrawal times of the one or more job seekers; and determine, using the one or more processors, a payment for the one or more job seekers based, at least in part, on the start time and the end time selected on the mobile computing device of the employer.

14. The system of claim 13, wherein the one or more processors enable the employer to provide a feedback using the user interface on the mobile computing device of the employer in order to affect the service reputation rating of a job seeker.

15. The system of claim 14, wherein the user interface enables the employer to select feedback ratings relating to one or more of: (1) cleaning, (2) professionalism, (3) timeliness, (4) knowledge, and (5) attitude.

16. The system of claim 14, wherein the service reputation rating is available to other employers.

17. The system of claim 13, wherein the transit progress information includes an estimated time of arrival that is provided on the mobile computing device of the employer.

18. The system of claim 13, wherein the one or more processors determine payment automatically in response to receiving the start time and the end time selected on the mobile computing device of the employer.

* * * * *